US009007415B2

(12) United States Patent
Erb

(10) Patent No.: US 9,007,415 B2
(45) Date of Patent: Apr. 14, 2015

(54) METHOD AND SYSTEM FOR AUDIO-VIDEO COMMUNICATIONS

(75) Inventor: Paul Andrew Erb, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 251 days.

(21) Appl. No.: 12/928,768

(22) Filed: Dec. 16, 2010

(65) Prior Publication Data

US 2012/0154509 A1 Jun. 21, 2012

(51) Int. Cl.
*H04N 7/15* (2006.01)
*H04N 7/14* (2006.01)

(52) U.S. Cl.
CPC ............... *H04N 7/15* (2013.01); *H04N 7/142* (2013.01); *H04N 7/147* (2013.01)

(58) Field of Classification Search
USPC .......................................... 348/14.01–14.16
See application file for complete search history.

(56) References Cited

U.S. PATENT DOCUMENTS

| 5,819,294 | A | * | 10/1998 | Chambers ................. 340/12.24 |
| 5,999,207 | A | * | 12/1999 | Rodriguez et al. ......... 348/14.03 |
| 2008/0136895 | A1 | * | 6/2008 | Mareachen ................. 348/14.03 |
| 2008/0267578 | A1 | * | 10/2008 | Zhang et al. .................... 386/52 |
| 2010/0083137 | A1 | | 4/2010 | Shin et al. |

FOREIGN PATENT DOCUMENTS

EP 1732322 A2 * 12/2006

OTHER PUBLICATIONS

Tandberg, Cisco "E20 VoIP Video Phone" E20 Product Sheet http://www.tandberg.com/products/tandberg_e20.jsp; Oct. 2009.
Jooyoung P. et al. "Facial Image Reconstruction by SVDD-Based Pattern De-noising" Advances in Biometrics Lecture Notes in Computer Science, 2005, 129-135, vol. 3832/2005.
Messaoud M. et al."Efficient Real time Face Tracking Operator Study and Impementation Within Virtex FPGA Technology" The International Arab Journal of IT; Jan. 2007; vol. 4 No. 1.
McCauley, T. "Understanding the Transformation Matrix in Flash 8" http://www.senocular.com/flash/tutorials/transformmatrix/ 2009 1-30.

* cited by examiner

*Primary Examiner* — Melur Ramakrishnaiah

(57) ABSTRACT

There is provided a system and method of audio-video communications including a plurality of end-user terminals coupled via a communications link. Each end-user terminal includes a video processor component, a user interface, a display, a speaker and a microphone, a video camera device and a storage device, all coupled to the processor. The user interface includes a video muting function. The video processor component includes a module responsive to the video muting function for switching from a video source of the video camera to a predetermined video signal. The video muting function includes a selection for muting video sent from one of the plurality of end-user terminals, muting video received by one of the plurality of end-user terminals, muting video, both video sent from and video received by one of the plurality of end-user terminals, or muting audio and video sent from one of the plurality of end-user terminals.

20 Claims, 3 Drawing Sheets

METHOD AND SYSTEM FOR AUDIO-VIDEO COMMUNICATIONS

FIELD OF THE INVENTION

The present invention relates to methods and systems for audio-video communications and is particularly concerned with video telephones or teleconferences.

BACKGROUND OF THE INVENTION

With the growing prevalence of video phone technology there are circumstances during a call where it may become inappropriate to observe the resultant video. Both parties may desire a conversation to continue, however, the video camera field of view may include activities which are not appropriate for viewing.

In general, people choose not to establish video communication or terminate the communication prematurely for privacy.

An alternative is to obstruct the video camera while privacy is desired, by hand placement or the use of a barrier (e.g. a towel thrown over the camera).

Another alternative is for the other party to avert their gaze as would be done if the persons were in the same room together.

Systems and methods disclosed herein provide methods and systems for audio-video communications to obviate or mitigate at least some of the aforementioned disadvantages.

BRIEF DESCRIPTION OF THE DRAWINGS

The present invention will be further understood from the following detailed description with reference to the drawings in which.

DETAILED DESCRIPTION OF THE PREFERRED EMBODIMENT

An object of the present disclosure is to provide an improved audio-video communications system and method.

Accordingly, in a two party video call, either party may initiate a video mute to and/or from the other party. The conversation continues while the video is muted as audio is not affected. The video mute may be in one direction or in both directions (and equivalents for conference calls). The video mute is terminated, resuming both voice and video communication, by the originally muting party or by mutual consent (requiring both parties to end the video mute). Video mute and audio mute may be invoked independently or in conjunction, as appropriate As used herein, "mute" and/or "video mute" implies a pausing, stopping or freezing of the video camera from transmitting live or nearly live video. Further, "mute" and/or "video mute" means a halting of transmitting live or nearly live images or frames to a receiving party on a video call. As indicated above, when the video mute function is invoked, audio may continue as normal.

Throughout the duration of a video phone call the users are provided an interface to mute video without affecting the audio call (e.g. by pressing a video mute hard key on the video phone). Upon invoking video mute the video transmission from the video phone is changed from the active camera field of view to a static image. The user invoking video mute is then provided an option of un-muting the video (e.g. by pressing the video mute key a second time). Upon un-muting video the video transmission is changed from a static image back to the active camera field of view.

Figure 1:
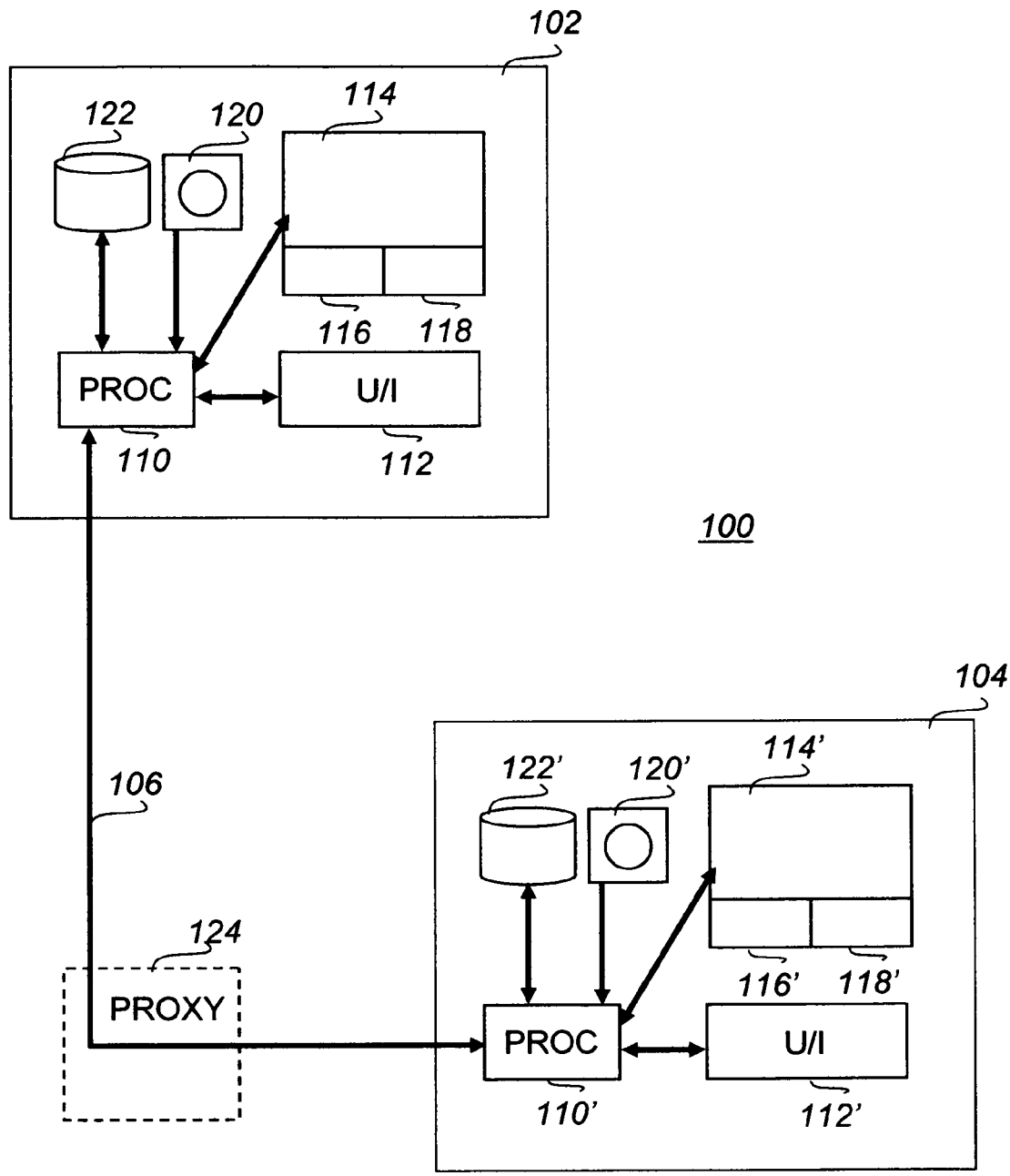
FIG. 1 illustrates an audio-video communications system in accordance with an embodiment of the present disclosure.

Referring to FIG. 1 there is illustrated an audio-video communications system in accordance with an embodiment of the present disclosure. An audio-video communications system 100 for a two-way video teleconference includes end-user terminals 102 and 104 coupled via a communications link 106. End-user equipment 102 includes a video processor component 110, a user interface 112, a display 114, for convenience shown with built in speaker 116 and microphone 118, a video camera device 120 and a storage device 122 all coupled to the processor. The communications link 106 may be a dedicated link or may be implemented via a data communications network, for example via the Internet. The communications link may include a proxy 124. The user interface 112 in the present example is a keypad. The keypad has dedicated keys for muting functions in accordance with the present disclosure. The muting options are shown in Table A.

TABLE A

| Key Pad Designation | Function |
| --- | --- |
| Mute Video Out | Mutes outgoing video |
| Mute Vid In | Mutes incoming video |
| Mute Vid Both | Mutes video both directions |
| Mute Aud/Vid Out | Mutes outgoing audio and video |
| Un-mute | Un-mutes any of the above mutes |

In operation, during a two party (bi-directional) video call either party may invoke one of several mute options, including an independent video mute. These options include some or all of, mute video from this party's camera to the other party's video screen (don't look)

mute video from the other party's camera to this party's video screen (avert gaze)

mute video in both directions (let's just talk)

mute both audio and video from this party's video phone (mute functionality)

For example, Ralph and Ted establish a video call where Ralph is a home office worker using a video phone 102, while Ted is a road warrior using a mobile video phone 104. Both Ralph and Ted may, for example, use Bluetooth® headsets for the audio portion of the call (not shown in FIG. 1).

Upon a change in circumstances, one party decides that the other party should not observe the video, but wishes to continue the audio conversation. They invoke the appropriate mute option from the choices available, for example, the first option above (don't look). An indication of video mute is provided to the user for whom the video image is not being transmitted through the user interface, for example using LEDs by the dedicated keys or by visual indication on the video display, for example, a graphical icon overlaying the top left corner of the received video image. Similarly, indication of video mute may also be provided to the user viewing the replacement or blank image.

The video phone 102 changes the video source for transmission from the video camera device 120 to the output of a video processor component 110. The video processor component 110 renders a still image, which is transmitted to the far end video phone 104 for display.

Upon a subsequent change in circumstances, the same party decides that the video portion of the call can resume. They invoke the corresponding un-mute option.

The video phone 102 then changes the video source for transmission from the output of a video processor component 110 to the video camera device 120. The active field of view of the video camera device is transmitted to the far end video phone 104 for display.

For example, Ralph chooses to mute video while he changes his socks and puts on his shoes in preparation for another meeting. The conversation continues uninterrupted and Ralph un-mutes video when he is again facing his laptop.

A further change in circumstances, one party decides that neither party should observe the video but again wishes to continue the audio conversation. They then invoke the appropriate mute option from the choices available, the third option above (let's just talk).

Signaling is exchanged with the far end video phone 104 (e.g. using SIP messaging to initiate two-party bi-directional video mute and identifying both parties). Both video phones and change the video source for transmission to the video processor component.

When one party chooses to resume video for the call they invoke the corresponding un-mute option. However, the video phone does not change transmission source but instead signals the far end video phone (e.g. using SIP messaging) to remove one-party from the bi-directional video mute.

When the second party chooses to resume video for the call they also invoke the corresponding un-mute option. Again, the video phone does not change transmission source but instead signals the far end video phone (e.g. using SIP messaging) to remove the one-party from the bi-directional video mute. As the signaling confirms both parties have un-muted video, each video phone proceeds with the change of transmission source from video processor component to video camera.

During the video muting, the video link remains active with transmission of the replacement image from source. However, an embodiment of the present disclosure could allow for optimization of A/V link, which may involve renegotiating audio only and audio/video communications paths and/or changing the transmission media involved. In this case the replacement image would be provided by the destination rather than transmitted from the source.

For example, Ted pulls into a gas station and chooses to mute video while he attends to his automobile. The conversation continues uninterrupted without video until Ted is back on the road and unmutes video.

Figure 2A:
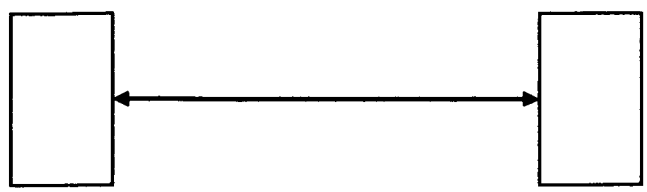
FIG. 2 graphically illustrates the possible variation of communications schemes.
Figure 2B:
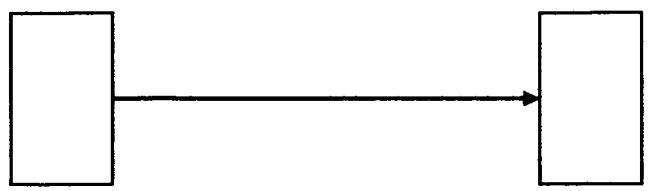
Figure 2C:
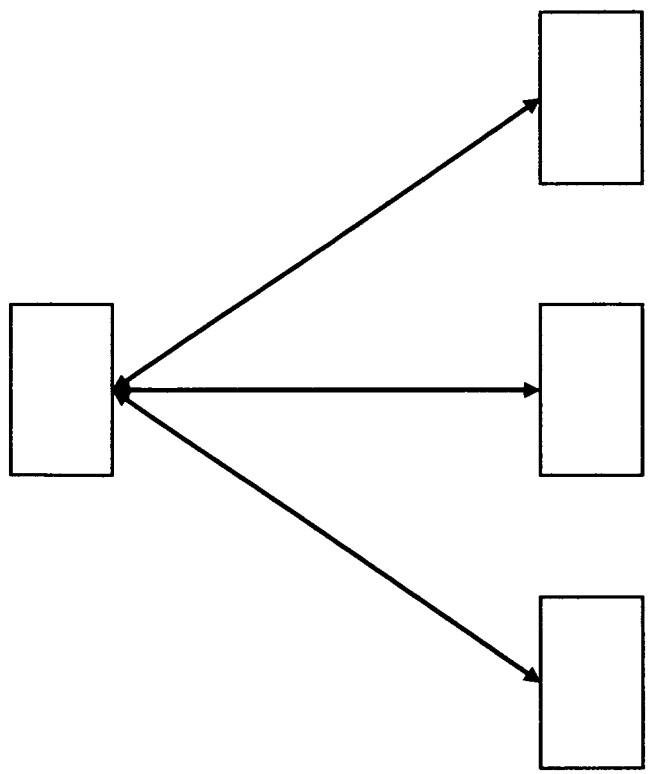

Referring to FIGS. 2a to 2c, there is graphically illustrated the possible variation of communications schemes. While a two party video call (bi-directional) is described herein above and as shown in FIG. 2a, the present disclosure also applies to uni-directional calls (FIG. 2b) and omni-directional calls with two or more parties (FIG. 2c), including video conference calls.

Figure 3A:
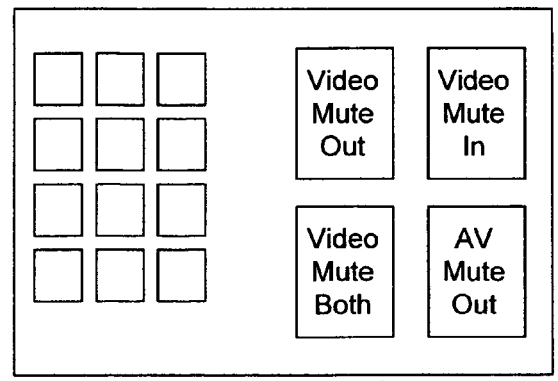
FIG. 3 illustrates a number of user interface options for implementing the system of FIG. 1 in accordance with an embodiment of the present invention.
Figure 3B:
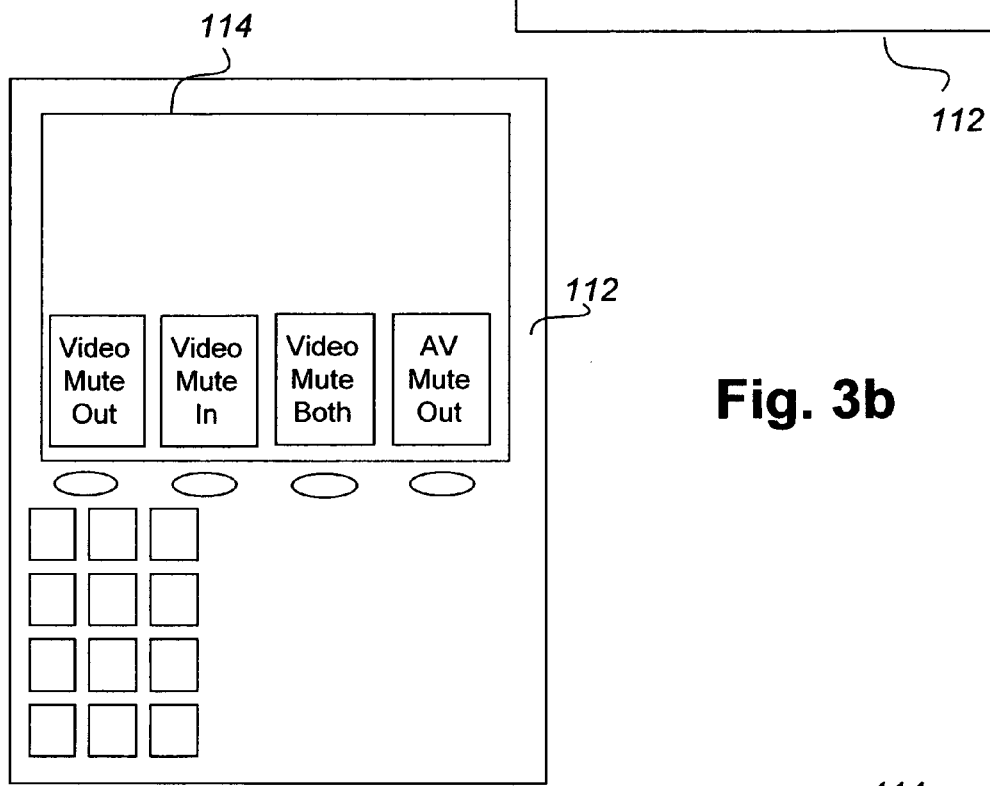
Figure 3C:
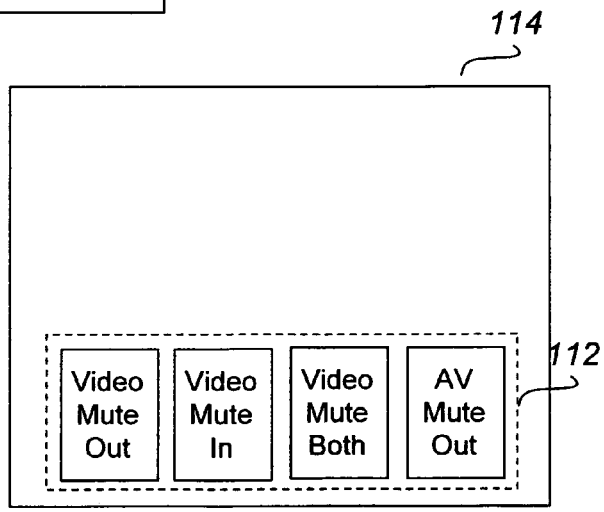

Referring to FIGS. 3a to 3c, there are illustrated a number of user interface options for implementing the present embodiment. The user interface to mute/un-mute video may involve physical keys on the video phone as shown in FIG. 3a, labelled soft keys as shown in FIG. 3b, and/or touch screens as shown in FIG. 3c. A graphical user interface (GUI), Interactive Voice Response (IVR), or speech recognition system may also be involved.

The video transmission while muted may use a video frame taken from just before the video mute was invoked. Alternatively, a photo image may be displayed (system or user configured, randomly selected or stock photo). A video or moving image may also be transmitted rather than a static image.

Any or all of the muting options may be provided in the user interface, muting options may also be combined with other user interface functions.

The video mute may be done by the proxy 124 of FIG. 1, possibly in conjunction with in-band or out-of-band signalling, to replace or alter the video transmission after it has been sent from the muted video phone.

The video processor component 110 may be a dedicated component or be a function of the computer processing capabilities of the video phone. The video processor component may continuously render an image or video or only render the image or video as required for transmission.

Numerous modifications, variations and adaptations may be made to the particular embodiments described above without departing from the scope patent disclosure, which is defined in the claims.

What is claimed is:

1. A system for audio-video communications comprising:
a plurality of end-user terminals coupled via a communications link;
each end-user terminals including a video processor component, a user interface, a display, a speaker and a microphone, a video camera, and a storage all coupled to the processor;
the user interface including a video muting function; and
the video processor component of a transmitting one of the end-user terminals including a module responsive to the video muting function for at least one of renegotiating audio only and audio/video communications paths and changing the transmission media involved, thereby causing a switch from a video source of the video camera to a predetermined still image provided by a destination one of the end-user terminals.

2. The system of claim 1, wherein the video muting function comprises a selection for muting video sent from the transmitting one of the end-user terminals.

3. The system of claim 1, wherein the video muting function comprises a selection for muting video received by the destination one of the end-user terminals.

4. The system of claim 1, wherein the video muting function comprises a selection for muting video both sent from and received by one of the plurality of end-user terminals.

5. The system of claim 1, wherein the video muting function comprises a selection for muting audio and video sent from the transmitting one of the end-user terminals.

6. The system of claim 1, wherein the user interface includes hard keys for selecting the video muting function.

7. The system of claim 1, wherein the user interface includes soft keys for selecting the video muting function.

8. The system of claim 1, wherein the user interface includes a touch screen for selecting the video muting function.

9. The system of claim 1, wherein the user interface includes at least one of graphical user interface (GUI), interactive voice response (IVR), or speech recognition system for selecting the video muting function.

10. A method of controlling audio-video communications, the method comprising:
establishing an audio-video call between a first and a second party each having an end-user terminal; and
during the call, one party selecting a video mute function on one of the end-user terminals and muting a video portion of the call while maintaining an audio portion of the call, wherein said video mute function comprises at least one of renegotiating audio only and audio/video communications paths and changing the transmission media involved, thereby causing a switch from a video source of the one party to a predetermined still image provided by the other party.

11. The method of claim 10, wherein the muting of the video portion comprises muting video sent from the one party.

12. The method of claim 10, wherein the muting of the video portion comprises muting video received by the one party.

13. The method of claim 10, wherein the muting of the video portion comprises muting both video sent from and video received by the one party.

14. The method of claim 10, wherein the muting of the video portion comprises muting audio and video sent from the one party.

15. An end-user terminal for audio-video communications comprising:
   a video processor component;
   a user interface, a display, a speaker and a microphone, a video camera device and a storage device, all coupled to the processor;
   the user interface including a video muting function; and
   the video processor component including a module responsive to the video muting function for at least one of renegotiating audio only and audio/video communications paths and changing the transmission media involved, thereby causing a switch from a video source of the video camera device to a predetermined still image provided by a further end-user terminal.

16. The terminal of claim 15, wherein the video muting function comprises a selection for muting video sent from the end-user-terminal.

17. The terminal of claim 15, wherein the video muting function comprises a selection for muting video received by the end-user terminal.

18. The terminal of claim 15, wherein the video muting function comprises a selection for muting video both video sent from and video received by the end-user terminal.

19. The terminal of claim 15, wherein the video muting function comprises a selection for muting audio and video sent from the end-user terminal.

20. The terminal of claim 15, wherein the user interface includes at least one of hard keys, soft keys, a touch screen, graphical user interface (GUI), interactive voice response (IVR), or speech recognition system for selecting the video muting function.

* * * * *